US008726654B2

(12) United States Patent
Cagnac et al.

(10) Patent No.: US 8,726,654 B2
(45) Date of Patent: May 20, 2014

(54) MASTER CYLINDER COMPRISING MEANS FOR INJECTING BRAKE FLUID INTO SAID MASTER CYLINDER, AND BRAKING SYSTEM COMPRISING SUCH A MASTER CYLINDER

(75) Inventors: Bastien Cagnac, Chantilly (FR); Chris Anderson, Paris (FR); Raynald Sprocq, Esbly (FR)

(73) Assignee: Robert Bosch GmbH, Stuttgart (DE)

( * ) Notice: Subject to any disclaimer, the term of this patent is extended or adjusted under 35 U.S.C. 154(b) by 687 days.

(21) Appl. No.: 13/054,725

(22) PCT Filed: Jul. 10, 2009

(86) PCT No.: PCT/EP2009/058814
§ 371 (c)(1),
(2), (4) Date: Jan. 18, 2011

(87) PCT Pub. No.: WO2010/006998
PCT Pub. Date: Jan. 21, 2010

(65) Prior Publication Data
US 2011/0120122 A1    May 26, 2011

(30) Foreign Application Priority Data

Jul. 17, 2008  (FR) ...................... 08 04081

(51) Int. Cl.
*F15B 7/08* (2006.01)
*B60T 13/128* (2006.01)

(52) U.S. Cl.
USPC ........................ 60/545; 60/547.1

(58) Field of Classification Search
USPC ................ 60/545, 547.1, 579, 562
See application file for complete search history.

(56) References Cited

U.S. PATENT DOCUMENTS

| 4,708,405 A | 11/1987 | Belart et al. |
| 6,195,994 B1 | 3/2001 | Bacardit |
| 6,363,720 B1 | 4/2002 | Nakano et al. |
| 2007/0266850 A1 | 11/2007 | Inoue et al. |

FOREIGN PATENT DOCUMENTS

| DE | 19626926 | 1/1998 |
| WO | 2007/080106 A1 | 7/2007 |
| WO | 2007/080158 A1 | 7/2007 |

OTHER PUBLICATIONS

PCT/EP2009/058814 International Search Report and Written Opinion.

*Primary Examiner* — Michael Leslie
(74) *Attorney, Agent, or Firm* — Michael Best & Freidrich LLP (57) ABSTRACT

The present invention relates mainly to a braking system comprising a master cylinder comprising means of connection to a hydraulic braking circuit and means of connecting at least one chamber of the master cylinder to means of injecting brake fluid into said chamber. The main subject of the invention is a master cylinder (48) comprising at least one variable-volume chamber and one moving piston (207), the movement of which causes the volume of said chamber to vary, and means of connecting said chamber to a hydraulic braking circuit, characterized in that it further comprises means (217) of connection to a source (116) of pressurized brake fluid. The invention applies notably to the motor industry. The invention applies mainly to the braking industry.

7 Claims, 6 Drawing Sheets

MASTER CYLINDER COMPRISING MEANS FOR INJECTING BRAKE FLUID INTO SAID MASTER CYLINDER, AND BRAKING SYSTEM COMPRISING SUCH A MASTER CYLINDER

BACKGROUND OF THE INVENTION

The present invention relates mainly to a braking system comprising a master cylinder comprising means of connection to a hydraulic braking circuit and means of connecting at least one chamber of the master cylinder to means of injecting brake fluid into said chamber.

It is known practice to produce brake boosters that apply a force to a thrust rod of a master cylinder which force is an increasing function of the force applied by the driver to a control rod via a brake pedal.

It is also known practice to use a pedal feel simulator connected to a pedal fitted with brake setpoint sensors associated with a booster producing said setpoint. At the expense of increased complexity and increased fragility, devices incorporating a simulator allow decoupling between the position of a brake pedal and the hydraulic pressure available in the braking circuits. Likewise, WO 2007/080106 and WO 2007/080158, which are incorporated into this patent application by reference, describe pneumatic brake boosters in which there is decoupling between the control rod and the thrust rod.

SUMMARY OF THE INVENTION

It is an object of the present invention to offer a braking system that uses a master cylinder allowing decoupling between the brake pedal and the pressure obtaining in the braking circuit supplied by said master cylinder that is highly robust and very simple to produce.

Another object of the present invention is to offer a braking system that has a brake pedal that is particularly pleasant for the driver to use, that is to say that has a refined pedal feel.

Another object of the present invention is to offer a braking system comprising a brake boosting device but which allows for effective braking in the event of nonoperation of this device.

These objects are achieved, according to the present invention, by, on command, injecting brake fluid into at least one of the chambers of the master cylinder.

The main subject of the invention is a master cylinder comprising at least one variable-volume chamber and one moving piston, the movement of which causes the volume of said chamber to vary, and means of connecting said chamber to a hydraulic braking circuit, characterized in that it further comprises means of connection to a source of pressurized brake fluid.

Another subject of the invention is a master cylinder characterized in that said means of connection to a source of pressurized brake fluid open directly into said variable-volume chamber.

Another subject of the invention is a master cylinder characterized in that it comprises a resupply chamber and in that said means of connection to a source of high-pressure brake fluid open into said resupply chamber.

Another subject of the invention is a braking system, characterized in that it comprises a master cylinder, a source of pressurized brake fluid connected by said means of connection to said variable-volume chamber of said master cylinder and control means for controlling the supply of pressurized brake fluid to said variable-volume chamber.

Another subject of the invention is also a braking system, characterized in that it further comprises hydraulic brake boosting means.

Another subject of the invention is a braking system, characterized in that it comprises means of connecting the source of pressurized brake fluid to a thrust chamber of said hydraulic brake boosting means.

Another subject of the invention is also a braking system, characterized in that it further comprises means of hermetically isolating, on command, said variable-volume chamber of said master cylinder with respect to said source of pressurized brake fluid.

Another subject of the invention is a system characterized in that said source of pressurized brake fluid comprises a master cylinder comprising a variable-volume chamber and a piston driven, on demand, by an actuator.

Another subject of the invention is a braking system characterized in that said master cylinder of the source of pressurized brake fluid is a tandem master cylinder comprising: a first chamber connected by means of connection to said chamber of said master cylinder comprising means of connection to a hydraulic circuit, and a variable-volume second chamber connected by a connection to said hydraulic brake boosting means.

Another subject of the invention is a braking system, characterized in that said master cylinder of said source of pressurized brake fluid comprises two chambers having two different diameters, and in that they comprise means translationally linking the means that vary the internal volumes of said variable-volume chambers of said master cylinder.

BRIEF DESCRIPTION OF THE DRAWINGS

The present invention will be better understood through the description which follows and from the appended Figures which are given by way of nonlimiting examples and in which.

DETAILED DESCRIPTION

In FIGS. 1 to 6, the same references are used to denote the same elements.

Figure 1:
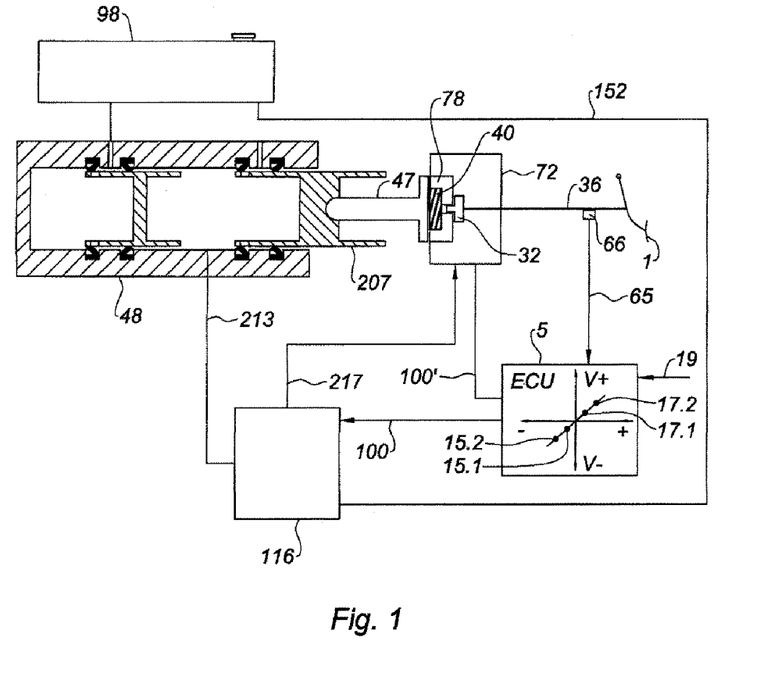
FIG. 1 is a schematic view in section illustrating a first embodiment of a system according to the present invention.

FIG. 1 shows a braking system comprising a brake pedal 1 that drives a control rod 36 which, in turn, presses against a brake booster 72. The brake booster 72 applies a force to a thrust rod, which force is amplified by the brake booster 72.

The booster 72 is, for example, a pneumatic brake booster, a hydraulic brake booster, an electrical brake booster or the like. Typically, the booster 72 is equipped with a reaction device, typically a reaction disk made of non-compressible elastomer, and which transmits to the control rod 36 part of the reaction to the thrust applied to the thrust rod 47.

The thrust rod 47 presses, on command, against a primary piston 207 of a master cylinder 48. In the advantageous embodiment illustrated, the master cylinder 48 is a tandem master cylinder, with resupply via a resupply chamber situated between two cups and resupply holes situated in the piston. However, use of other types of master cylinder, such as single (single chamber) master cylinders or master cylinders with a number of chambers higher than two does not constitute a departure from the scope of the present invention. Likewise, the use of master cylinders with valves or the like does not constitute a departure from the scope of the present invention.

A reservoir of brake fluid 98 feeds the chambers of the master cylinder 48 either directly, under gravity, or indirectly. The master cylinder 48 further comprises means of connection to a hydraulic braking circuit comprising brakes fitted with hydraulic pistons.

Advantageously, the system according to the present invention further comprises a sensor 66 detecting the braking setpoints 65 transmitted to an electronic control unit 5 (an ECU). The control unit 5 also receives a signal 19 from other sensors, notably from the pressure sensors or from other control units of the vehicle. The control unit 5 delivers a control signal 100 to a source 116 of pressurized brake fluid. In a first alternative form of embodiment, which has not been illustrated, the brake booster 72 delivers, on the thrust rod 47, a force which is an increasing function of the force applied by the rod 36. The ratio between the force applied by the rod 36 to the brake booster 72 and the force applied by this brake booster 72 to the thrust rod 47 is known as the boost ratio. The boost ratio is constant for low pressure braking actions and increases, advantageously, for the high-pressure braking actions corresponding to emergency braking actions by using an emergency braking assistance device more commonly known as a brake assist device.

In the example illustrated, the control unit 5 is also connected by a control link 100' to the brake booster 72, the boost force being applied by the booster 72 according to a setpoint 100' formulated by the control unit 5 as a function of the signal 65 delivered by the sensor 66 and/or of the signal 19.

The source of pressure is connected via connection 213 to one of the chambers, for example, as illustrated, the primary chamber of the master cylinder 48.

The source 116 prefills and/or fills the primary chamber of the master cylinder 48 allowing the active modes, that is to say modes that do not require the pedal 1 of the braking system to be depressed, to operate, for example for automatic braking at the command of a radar (ACC), for parking braking or the like.

The increase in pressure in the primary chamber of the master cylinder 48 pushes the secondary piston which in turn causes the pressure in the secondary circuit to rise.

Moreover, in the normal braking mode, that is to say braking that occurs as a result of the driver depressing the pedal 1 with his foot, it is possible, according to the invention, by injecting a volume of fluid into the primary and/or secondary chamber of the master cylinder 48, to shorten the pedal travel obtained, this shortening of the pedal travel under normal operation making it possible to select a small-diameter master cylinder which, were the device according to the present invention not present, would result in a pedal travel that was too long to be acceptable to the user. However, the reduction in master cylinder diameter is masked by the fact that brake fluid is injected into the primary chamber and/or the secondary chamber of the master cylinder. It is, for example, possible to use master cylinders 48 of diameters ranging between and 50 mm, preferably between 10 mm and 40 mm, and more preferably still of between 19.6 mm and 33 mm, for example of 22.2 mm, 23.8 mm or 25.4 mm.

Reducing the diameter of the master cylinder for the same pedal travel, or even for a shortened pedal travel so as to increase driver comfort under normal braking circumstances makes it possible, in addition, to increase the pressure in the brakes, for a given force with which the pedal 1 is depressed in the event of failure of the source of pressure 116. It should be noted that, in the event of such a failure, with a reduced-diameter master cylinder, the solution is an increase in the pedal travel in the failure situation (which increase can no longer be masked without any injection of brake fluid into the primary and/or secondary chamber of the master cylinder 48). However, this increase in pedal travel will be entirely acceptable inasmuch as it occurs only under exceptional circumstances (only in the event of failure of the source of pressure 116) and inasmuch as it improves the efficiency of the braking, particularly for drivers incapable of applying too great a force to the brake pedal (notably for the elderly and some women).

Likewise, the present invention is particularly advantageous for hybrid vehicles that comprise a combustion engine and an electric motor that are able to operate as generators that recharge the batteries during braking. Specifically, the regenerative braking performed by the electric motor operating as a generator has to be supplemented in order to obtain the desired level of braking. Thus, active braking may correspond to this braking top-up while at the same time giving a normal pedal feel, the control rod 36 and the thrust rod 47 being decoupled by an injection of brake fluid into the thrust chamber 76.

When the booster 72 is a hydraulic brake booster (sometimes known as a hydroboost), it is advantageous for the source 116 to be connected to the booster 72 via a connection 217. However, use of a separate high-pressure source for supplying a hydraulic brake booster does not constitute a departure from the scope of the present invention.

As will be explained in greater detail in relation to FIG. 3, it is advantageous for the chamber of the master cylinder 48 connected to the source 116 not to be connected directly to the brake fluid reservoir 98. For example, the resupply and/or removal of brake fluid to/from the primary chamber takes place via the connection 213, the source 116 and a connection 152 to the reservoir 98.

The braking system of FIG. 1 requires the use of a source 116 that is particularly reliable inasmuch as any leak through the connection 213 would lead to the loss of the primary braking circuit. On the other hand, it has the advantage of allowing excess brake fluid situated in the primary chamber to be removed on demand.

Figure 2:
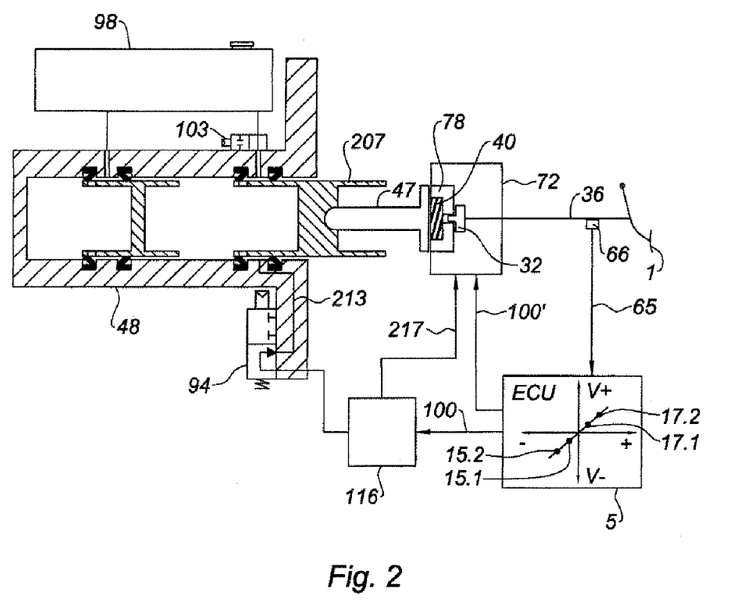
FIG. 2 is a schematic view in section of a second embodiment of a braking system according to the present invention.

The braking system of FIG. 2 differs from the one illustrated in FIG. 1 in that the connection 213 connecting a chamber of the master cylinder to the source 116 opens into the resupply chamber situated between two cups resting against the primary piston 207 and, moreover connected by gravity flow to the brake fluid reservoir 98. In such an instance, an electrically operated valve 103 is provided and this on command hermatically isolates the resupply of the resupply chamber of the primary chamber of the master cylinder 48 with respect to the reservoir 98.

Specifically, the source 116 injects pressurized brake fluid into the resupply chamber which is connected to the brake fluid reservoir 98 that is at atmospheric pressure. The electrically operated valve 103, advantageously controlled by the control unit 5, prevents pressurized fluid from rising back up into the reservoir. By contrast, the pressurized fluid lays down the front cup and is able to resupply the primary chamber of the master cylinder 48. However, the connection 213 no longer allows surplus liquid to be removed from the primary chamber of the master cylinder 48, which surplus is removed to the reservoir 98 when the piston 207 has retreated in such a way that the resupply hole in said piston 207 opens into the resupply chamber.

It should be noted that a leak on the connection 213, under braking, does not reduce the pressure obtaining in the primary chamber of the master cylinder. However, in the long term, such a leak could lead to a reduction in the brake fluid level in the reservoir 98.

A connection 213 supplies pressurized fluid, advantageously pressurized brake fluid, to the chamber of the master cylinder 48 from the pressure source 116, is fitted with moving elements for pressurizing the fluid, advantageously driven directly or indirectly via a motor 88, advantageously an electric motor. The source 116 advantageously comprises a pump, preferably a piston pump and more preferably still one comprising an odd number of pistons equal, for example, to three or five pistons. The pressurizing means may be connected directly to the connection 213; when they are, the increase in pressure in this chamber is obtained by starting up the means of pressurizing the source 116. As an alternative, the source 116 stores pressurized fluid and comprises means, advantageously at least one electrically operated valve, of hermetic isolation so that on command 100 it can deliver pressurized fluid to the primary chamber of the master cylinder 48.

Likewise, it may prove advantageous to have means of hermetic isolation, on demand, external to the source 116, such as the electrically operated valve 94 in FIG. 2.

Furthermore, the electrically operated valve 94, or means of hermetic isolation internal to the source 116 make it possible to avoid having to actuate the means of generating pressure of the source 116 when such activation is not needed, for example under constant-level braking.

In the advantageous embodiment illustrated, the braking system comprises a sensor 66, advantageously a position sensor, or preferably still a position sensor that senses relative position of a first set of moving gear connected to the brake pedal 1 with respect to the position of a second set of moving gear connected to a piston 78 that boosts the braking. Of course other sensors can be used such as, for example, a position sensor that senses the absolute position of the control rod 36, a strain gauge that gauges the force applied to this rod, a pressure sensor that senses the pressure obtaining in the braking circuits and/or the source 116, or the like. In the advantageous embodiment illustrated, the sensor 66 delivers a signal 65 to a control unit 5 (ECU standing for Electronic Control Unit) which in turn delivers a control signal 100 to the pressure source 116. Advantageously, the control unit 5 comprises a program that operates the pressure source 116 on the basis of the relative position of the two sets of moving gear, it being possible for the equilibrium position sought by the setpoints of the control unit 5 to be zero or, advantageously, to correspond to an offset so as, as symbolically depicted in FIG. 4 by the points 15.1, 15.2, 17.1 and 17.2, dynamically on demand to increase or decrease the jump during the braking action.

Figure 3:
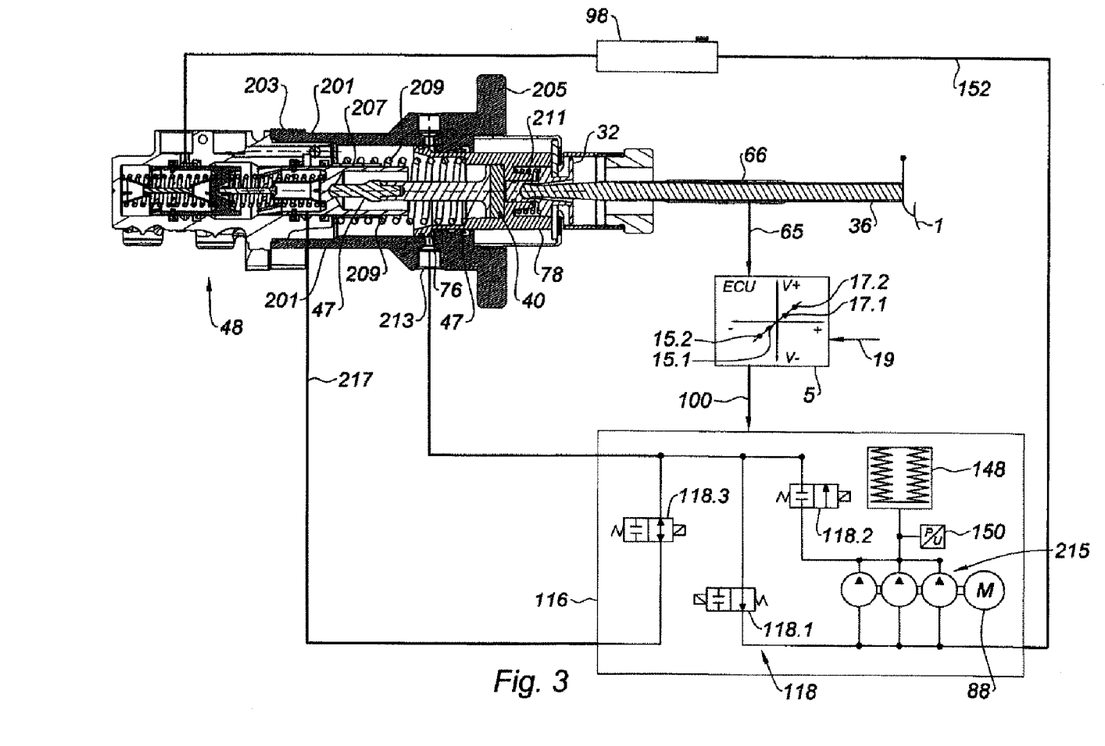
FIG. 3 is a view in section of a third embodiment of the braking system according to the present invention.

FIG. 3 shows one exemplary embodiment of a booster according to the present invention associated, at the front, with a master cylinder 48, advantageously a tandem master cylinder. Advantageously the booster comprises a substantially tubular body 201 of which the front part 203 accepts the rear part of the master cylinder 48 with, for example, a bolted connection using bolts (not depicted) that pass through openings formed in flanges or the like. It is advantageous to be able to use standard master cylinders, or master cylinders which at most have been modified slightly by comparison with standard master cylinders normally used with pneumatic brake boosters. The rear part 205 comprises a flange for attaching to the bulkhead of the vehicle. Inside a bore of the body 201 is a hydraulic system 78 which, with said bore, delimits a thrust chamber 76. Advantageously, the booster according to the present invention is equipped with a reaction device, such a reaction disk 40 positioned, in the example illustrated, in a housing in the piston 78, the rear face of which housing forms a shoulder that rests against the rear face of the disk 40 and has a central opening for accepting a plunger 32. The ratio of surface areas between that of the shoulder of the pneumatic piston and that of the front face of the plunger 32 able to rest against the rear face of the disk 40 determines the boost ratio of the booster. A distance at rest between the front face of the plunger and the rear face, facing it, of the reaction disk, measured along the axis of the booster-master cylinder assembly, determines the jump. A thrust rod 47 rests against a front face of the reaction disk 40 and against the rear of a primary piston 207 of the master cylinder. A return spring 209, advantageously a helical spring, returns the hydraulic piston 78 to its rest position. Likewise, a return spring 211 of lower spring stiffness returns the plunger 32 to its rest position. A control rod 36 receives the thrust from a brake pedal 1 and transmits it to the plunger 32.

The booster of FIG. 3 exhibits a high level of operational safety inasmuch as, in the event of failure of the source 116, only the return spring 209 opposes the (unboosted) braking allowing a defective vehicle to be brought to a halt. The force that has to be applied, notably in such a case, can be further limited by choosing a small diameter for at least one of the bores of the master cylinder 48.

FIG. 3 shows one exemplary embodiment of a booster according to the present invention in which the pressure source 116 comprises a pump 215 driven by an electric motor 88. Advantageously, the source 116 comprises means 118 of hermetically isolating, on demand, advantageously at the demand of the control unit 5, the supply connection 213 of the thrust chamber 76. In the example illustrated in FIG. 3, the means 118 of hermetic isolation comprise a first electrically operated valve 118.1 which, on demand, upon release of the brakes or reduction in braking effort, commands the return of brake fluid to a brake fluid reservoir 98. Return is, for example, via a line 152 connecting the outlet of the electrically operated valve 118.1 and the low-pressure inlet of the pump 215 to the reservoir 98.

Moreover, the reservoir 98 provides a gravity feed of brake fluid under atmospheric pressure to the master cylinder 48.

Advantageously, the means of hermetic isolation also comprise an electrically operated valve 118.2 which, on command, advantageously at the command of the control unit 5, connects the high-pressure outlet of the pump 215 to the connection 213 of the thrust chamber 76. Although use of the proportionally electrically operated valve does not constitute a departure from the scope of the present invention, the electrically operated valves used in the various alternative forms of booster according the present invention advantageously use electrically operated valves that operate in on/off mode, advantageously controlled by pulse width modulation (PWM).

Advantageously, the pressure source 116 comprises, connected to the high-pressure outlet of the pump 215, a pressurized brake fluid accumulator 148 which allows the motor 88 of the pump 215 to be switched on only when necessary, for example when the pressure on the outlet side of the pump 215/of the accumulator 148 is below a desired pressure low threshold detected, for example, by a pressure sensor 150.

When the driver presses his foot on the pedal 1, on the one hand, he actuates the control rod 36, the plunger 32, the reaction disk 40, the thrust rod 47 and the primary piston 207 of the master cylinder. The increase in pressure in the primary chamber causes the secondary piston of the master cylinder 48 to move. Moreover, the braking setpoint is detected by a sensor, for example the sensor 66 which sends a signal to the control unit 5 to cause pressurized fluid to be supplied, from the source 116 to the thrust chamber 76, simultaneously providing brake boosting. Moreover, the control unit 5 may, via a link 19, receive additional information from other sensors and/or control units of the vehicle. For example, it may receive an automatic brake command without the driver depressing the pedal 1. This braking is also brought about by supplying the chamber 76 with pressurized fluid via the connection 213. It should be noted that in the example illustrated in FIG. 2, the brake pedal 1 depresses under automatic braking actions.

Advantageously, at least some of the devices of the source 116 are used for modulating the braking and particularly by the antilock braking system (ABS), the antislip regulator (ASR), the electronic stability program (ESP) or the like. Use of the pump 215, of the motor 88 of the sensor 150 and, possibly, of the accumulator 148 and of the means of hermetic isolation 118 which are common makes it possible to reduce the cost of the vehicle braking system and/or to offer additional functionality for a modest increase in cost.

Advantageously, the means 118 hermetically isolating the source 116 further comprise a third electrically operated valve 118.3 which, at the command of the control unit 5, connects a high-pressure outlet of the pump 215, of the accumulator 148 and/or of the electrically operated valve 118.2 to one of the chambers of the master cylinder 48 for example, as illustrated, to the primary chamber of said master cylinder 48. In a first alternative form of embodiment, a supply pipe 217, which on demand supplies the primary chamber of the master cylinder, opens into a resupply chamber of the master cylinder positioned between two cups resting against the primary piston 207. In such an instance, a leak at the valve 118.3 and 118.1 does not comprise braking safety inasmuch as the cups oppose any reduction in pressure in the chamber of the master cylinder. However, in such an instance, it is necessary to ensure hermetic isolation of the resupply chamber with respect to the reservoir so as to avoid introducing pressured brake fluid into this reservoir. In a first alternative form illustrated in FIGS. 2 and 4, an additional electrically operated valve 103 is positioned on the supply connection of the chamber of the master cylinder and the reservoir 98. In the advantageous example illustrated, the direct link between the reservoir 98 and the resupply chamber/primary chamber of the master cylinder 48 is quite simply eliminated. In actual fact, resupplies and returns-to-tank 98 of the brake fluid take place via the line 217, the electrically operated valve 118.3, the electrically operated valve 118.1 and the line 152.

Advantageously, the effective surface area of the thrust chamber 76 is tailored to suit the effective surface area of the primary and/or secondary piston of the master cylinder 48.

For example, the effective surface area of the thrust chamber 76 is increased by comparison with those of the chambers of the master cylinder if compensation for a low pressure (for example limited to $10^7$ Pa) of the source of pressurized brake fluid is desired. However, such a ratio of surface areas carries the risk of inducing a movement of the brake pedal 1 in the active modes.

For the same said surface areas, the saturation pressure, that is to say the maximum pressure supplied by the high-pressure source, is equal to the pressure generated by the boost on the output side of the master cylinder. The pedal 1 remains stationary during the active modes.

For effective surface areas of the thrust chamber 76 which are smaller than those of the pistons of the master cylinder, the volume of fluid to be supplied to the chamber 76 for a given level of braking is reduced, making it possible to limit the pump output, in order to reduce the volume of the accumulator and/or to improve the braking dynamics, that is to say to reduce the response time of the braking system.

Figure 4:
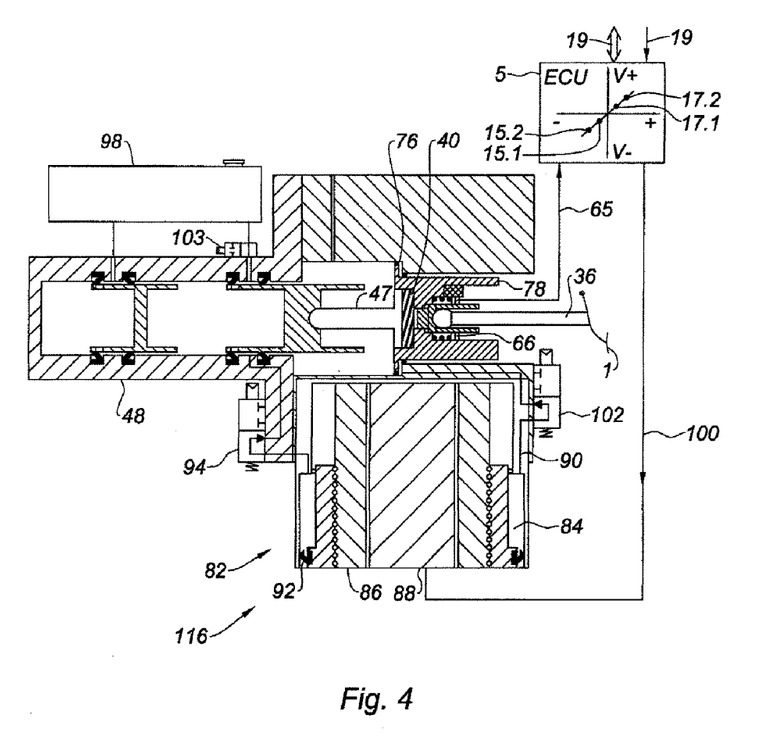
FIG. 4 is a schematic view in section of a fourth embodiment of the device according to the present invention.

In the example illustrated in FIG. 4, the source of pressure 116 for supplying the thrust chamber 76 comprises a master cylinder 82 comprising a variable-volume chamber 84 in which the pressure of the brake fluid is increased by a piston driven, on demand 100, by a motor 88, advantageously an electric motor.

In the example illustrated in FIG. 4, the chamber 84 is an annular chamber connected by a line 90 to the thrust chamber 76. Advantageously, the motor is a stepping motor and drives the piston 86 via a ball screw.

In the advantageous example illustrated, the piston 86 comprises, at least at one of its axial ends, a hydraulic seal able to withstand the control pressures and, preferably, as illustrated, a seal of the cup type.

Advantageously, the booster according to the present invention further comprises an electrically operated valve 94 which, on demand, hermetically closes a line 96 connecting the chamber 84 to the master cylinder 48. In the advantageous example illustrated, the line 96 opens on the side of the master cylinder 48 between two cups which, in the known way, delimit a master cylinder resupply chamber. This chamber is also connected to a brake fluid reservoir 98. Further, at rest, the resupply chamber is connected by openings made in the primary piston to the primary chamber of the master cylinder 48. By contrast, when the primary piston moves forward, the openings travel beyond the anterior cup allowing the pressure in the braking circuit to increase. In the event of a failure of the motor 88 during the braking action, the electrically operated valve 94 allows the pressure in the chamber 84 to be released into the reservoir 98 thus avoiding, in the event of a fault with the motor 88, undesired braking. Likewise, it should be noted that in the absence of boost following a fault with the motor 88, thrust on the control rod directly drives the thrust rod 47 without the need to drive the motor 88.

Advantageously, the booster according to the present invention comprises a second electrically operated valve 102 which, on demand, isolates the thrust chamber 76 from the chamber 84 of the master cylinder 82. Thus it is possible to maintain a constant hydraulic braking pressure independently of the action of the motor. This may be beneficial, for example, for constant pressures on the brake pedal, for example when stationary at a red traffic light, when stationary for a lengthy period, or when driving downhill with constant braking. Thus, there is no need in such a case to actuate the motor 88. The electrical consumption and wear of the motor are thus reduced. The second electrically operated valve 102 is particularly beneficial when use is made of reversible screws, that is to say of screws that can be turned by variation in pressure in the driving chamber 76.

Advantageously, the booster according to the present invention further comprises a third electrically operated valve 103 which, on demand, isolates the primary chamber of the master cylinder 48 from the brake fluid reservoir 98. It is thus possible to ensure prefilling of the braking circuit through the master cylinder by opening the electrically operated valve 94 and closing the electrically operated valve 103 so as to prevent the pressure supplied to the primary chamber from escaping to the reservoir. It should be noted that the prefilling of the brakes takes place without any forward movement of the control rod 36, or, therefore, of the brake pedal 1. Likewise, the combination of the electrically operated valve 94 being open and the electrically operated valve 103 being closed allows active braking modes, that is to say modes where braking is at the demand of the control unit 5, to be implemented without the need for action on the part of the driver and without any movement of the pedal 1. It should be noted that the secondary piston transmits to the secondary chamber the pressure that is obtaining in the primary chamber, notably during active braking.

Prefilling of the brake may be highly beneficial in shortening braking distances and/or in allowing the use of hydraulic brakes with increased piston retreat with a zero and/or at the very least reduced residual (undesired) braking torque.

Further, the electrically operated valve 103 or any other means of hermetic isolation on demand can be actuated to isolate at least one of the chambers of the master cylinder 48, typically the primary chamber so as, for example, to reduce the dead travel at the time of actuation of the brakes and preferably before the resupply holes in the primary piston have moved beyond the front cup of the primary chamber of the master cylinder or, if an abnormally high temperature has been detected during braking that carries the risk of causing the brake fluid to boil if the brakes are released. However, during complete brake release, that is to say when there is no longer any pressure applied to the brake pedal, possibly after a timed period has elapsed, the electrically operated valve 103 is reopened so as to avoid undesired braking.

Figure 5:
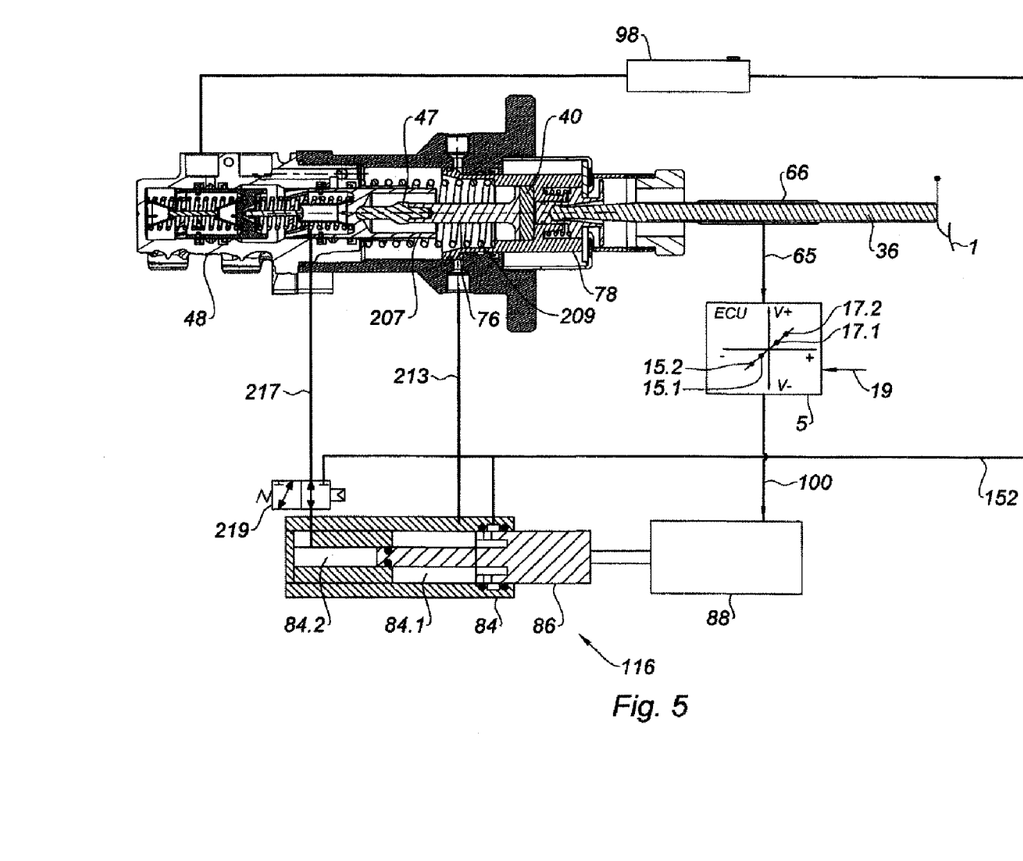
FIG. 5 is a view in section of a fifth embodiment of a braking system according to the present invention.

FIG. 5 shows one advantageous example of a booster according to the present invention in which the thrust chamber is supplied by a motorized master cylinder 84. In the advantageous example, the master cylinder 84 is a tandem master cylinder, illustrated in greater detail in FIG. 6, of which the primary chamber 84.1 supplies the connection 213 of the thrust chamber 76 and of which a secondary chamber 84.2 supplies, via a connection 217, the primary chamber of the master cylinder 48. It should be noted that in such a case, supply takes place preferably directly into the chamber of the master cylinder rather than into the resupply chamber thereof. Advantageously, as illustrated, only the secondary chamber of the master cylinder 48 is supplied, under gravity, from the brake fluid reservoir 98 at atmospheric pressure. Advantageously, a two-way electrically operated valve 219 on demand, under braking, connects the secondary chamber 84.2 of the master cylinder 84 to the primary chamber of the master cylinder 48 that supplies the braking circuit. In this position, the electrically operated valve 219 simultaneously hermetically isolates the line 217 for supplying the primary chamber of the master cylinder 48 with respect to the line 152 connected to the reservoir 98.

In a second position, under no braking, the valve 219 isolates the line 217 with respect to the secondary chamber 84.2 of the master cylinder 84 (and with respect to the line 152 connected to the reservoir 98) and connects the line 152 to the secondary chamber 84.2 of the master cylinder 84. Advantageously, the connection 152 is also permanently connected to a resupply chamber 221 of the primary chamber 84.1 of the master cylinder 84. Said resupply chamber 221 is delimited in a bore of the master cylinder 84 by two cups 223 resting against the primary part of the piston 86. Said piston 86 comprises resupply holes 225 advantageously positioned uniformly in the radial direction so as, at rest, that is to say when the piston 86 is retreated as far as it will go (to the right in FIG. 6) to place the primary chamber 84.1 of the master cylinder 84 in communication with the line 152 connected to the reservoir 98. Forward movement of the piston 86 moves the resupply holes 125 which travel beyond the front cup 123 which at that moment then isolates the line 152 with respect to the primary chamber 84.1.

Figure 6:
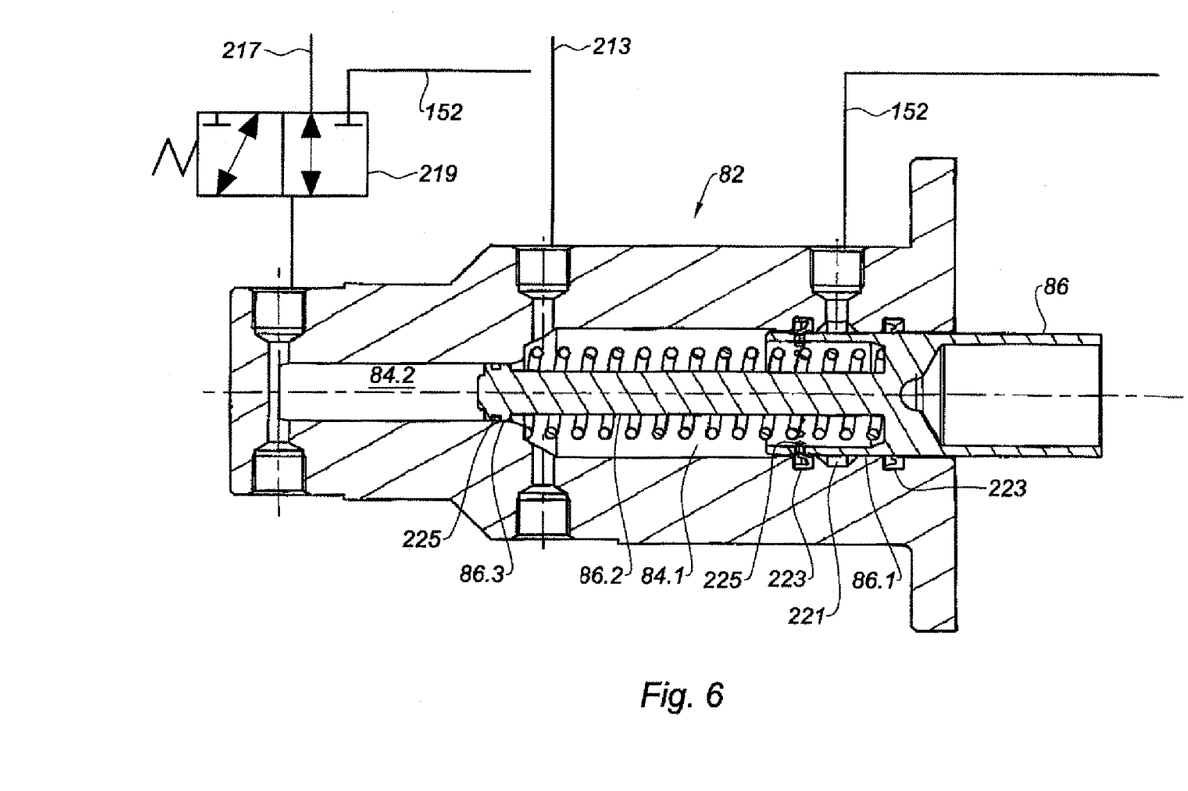
FIG. 6 is a view in section, on a larger scale, of the brake fluid injecting means used in the system of FIG. 5.

Advantageously, the bores of the primary 84.1 and secondary 84.2 chambers of the master cylinder 84 have different diameters. For preference, the diameter of the secondary chamber 84.2 is smaller than the diameter of the primary chamber 84.1. Thus, With the electrically operated valve 119 not activated, actuating the brake pedal causes, according to the setpoint of the control device, a displacement of hydraulic fluid from the primary chamber of the master cylinder 84 toward the working chamber 76. At the same time, the volume swept by the secondary chamber of this same master cylinder will be transferred to the reservoir without an increase in pressure through the electrically operated valve 219 and the line 152. The latter displacement of fluid will therefore have no impact on the braking characteristic. The relationship between the input travel imparted to the control rod 36 and the pressure in the primary and secondary chambers of the master cylinder 48 will therefore be a function of the respective cross sections of the chambers of the latter master cylinder, and of those of the vehicle brake receivers (brakes), as in conventional so-called "non-decoupled" braking system.

With the electrically operated valve 119 activated, because of the complete separation between the two chambers of the master cylinder, actuating the brake pedal causes, according to the setpoint of the control device, hydraulic fluid to be displaced simultaneously from the primary chamber of the master cylinder 84 toward the working chamber 76 and from the secondary chamber of the latter master cylinder toward the primary chamber of the master cylinder 48. The capacity of the latter volume of fluid will be dependent on the cross section of the secondary chamber of the master cylinder 84. This additional volume by comparison with the braking situation described in the previous paragraph contributes to the filling of the primary and secondary braking circuits of the vehicle. The result of this is that the travel imparted to the control rod 36 that is needed in order to achieve a given pressure in the braking circuit will be shortened by an amount proportional to the cross section of the secondary chamber of the master cylinder 84. It is thus possible with a braking system of the so-called non-decoupled type and which therefore offers advantages in terms of robustness and pedal feel over a system of the so-called "decoupled" type with a simulator, to obtain a shorter input travel/circuit pressure braking characteristic while at the same time maintaining a master cylinder 48 which is sized conventionally so as to achieve the backup (in the event of booster failure) performance required by legislation.

Conversely, a vehicle which relies on an electronic system of the HBC type, that is to say where pressure is generated by the hydraulic unit of the ESP device in order to compensate for a potential failure in the brake booster in order to comply with the legislation so as to be able to maintain an acceptable pedal travel under normal braking mode, may benefit from the invention in order to gain robustness. Thus, for example, a complete electrical power failure in the vehicle will have no impact on the emergency braking performance, unlike the case with a vehicle that relies on the electronic function in order to achieve the stopping distances required by the legislation.

Furthermore, this device can be used as a function that allows the driver to choose between two braking system behaviors. The choice is made via a user interface, for example by pressing a control key or by choosing from a vehicle setup menu. For example, a "normal" mode in which the electrically operated valve 119 is in the inactivated position and a "sport" mode in which the electrically operated value 119 is activated, thus offering the driver a shorter pedal better suited to sporty driving.

Advantageously, a single piston 86 between two pistons mechanically linked in terms of translation along the axis of the master cylinder 84 allows the brake fluid present in the chambers 84.1 and 84.2 to be pressurized. In the advantageous example illustrated, the single piston 86 has a rear tubular region 86.1 against which the cups 223 rest which are extended forward as far as the chamber 84.2 by a coaxial rod 86.2 ending in a disk 86.3 that forms the secondary piston equipped with a groove to accept a seal 225, for example an O-ring.

The piston 86 is able to supply the chamber of the master cylinder 48 and the thrust chamber 76 but also, the length and the diameters of the pistons make it possible to select the volumes that have to be injected.

The invention applies notably to the motor industry.

The invention applies mainly to the braking industry.

(5) Control unit
(19) Signal
(32) Plunger
(36) Control rod
(40) Reaction disk
(47) Thrust rod
(48) Master cylinder
(65) Braking setpoints
(66) Sensor
(72) Brake booster
(76) Thrust chamber
(78) Piston
(84) Chamber
(86) Piston
(88) Motor
(90) Line
(94) Electrically operated valve
(96) Line
(98) Brake fluid reservoir
(100) Control signal
(103) Electrically operated valve
(116) Source
(118) Means (of thermal insulation)
(148) Accumulator
(150) Pressure sensor
(152) Link
(201) Body
(203) Front part
(205) Rear part
(207) Primary piston
(209) Return spring
(211) Return spring
(213) Connection
(215) Pump
(217) Connection
(221) Resupply chamber
(223) Cups
(225) Resupply holes

The invention claimed is:

1. A braking system comprising a master cylinder (48) comprising at least one variable-volume chamber and one moving piston (207), movement of which causes the volume of said chamber to vary, characterized in that said master cylinder further comprises means (217) of connection to a source (116) of pressurized brake fluid including a second master cylinder including a variable-volume chamber (84.2) and a piston (86) driven, on demand from an electronic control unit (5), by an actuator (88), said chamber (84.2) of said second master cylinder being connected by said means of connection (217) to said chamber of said master cylinder (48), and a variable-volume second chamber (84.1) connected by a connection (213) to a hydraulic brake boosting means (72).

2. The braking system according to claim 1, characterized in that said means (217) of connection to the source (116) of pressurized brake fluid opens directly into said variable-volume chamber of said master cylinder.

3. The braking system according to claim 1, characterized in that said master cylinder comprises a resupply chamber and in that said means (217) of connection to a source of high-pressure brake fluid opens into said resupply chamber.

4. The braking system according to claim 1, further comprising control means (219, 118) for controlling the supply of pressurized brake fluid to said variable-volume chamber.

5. The braking system according to claim 1, wherein the connection (213) connects the source of pressurized brake fluid (116) to a thrust chamber (76) of said hydraulic brake boosting means (72).

6. The braking system according to claim 4, characterized in that said control means (118, 219) hermetically isolates, on command, said variable-volume chamber of said master cylinder (48) with respect to said source (116) of pressurized brake fluid.

7. The braking system according to claim 1, characterized in that said second master cylinder of said source (116) of pressurized brake fluid comprises two chambers (84.2, 84.1) having two different diameters, and in that said chambers (84.2, 84.1) comprise means (86.2) translationally linking means (86.3, 86.1) that vary the internal volumes of said variable-volume chambers (84.2, 84.1) of said second master cylinder.

* * * * *